United States Patent [19]

Farries et al.

[11] Patent Number: 5,257,273
[45] Date of Patent: Oct. 26, 1993

[54] AMPLIFIER/FILTER COMBINATION

[75] Inventors: Mark C. Farries, Northampton; Douglas C. J. Reid, Rugby; Catherine M. Ragdale, Towcester, all of England

[73] Assignee: GEC-Marconi Limited, Stanmore, England

[21] Appl. No.: 843,164

[22] Filed: Feb. 28, 1992

[30] Foreign Application Priority Data

Mar. 27, 1991 [GB] United Kingdom ............... 9106518

[51] Int. Cl.$^5$ .................................................. H01S 3/30
[52] U.S. Cl. .................................. 372/6; 372/69; 372/102; 385/27; 385/37
[58] Field of Search ............... 372/6, 102, 69; 385/27, 385/37

[56] References Cited

U.S. PATENT DOCUMENTS

| 4,358,851 | 11/1982 | Scifres et al. | 372/6 |
| 4,723,249 | 2/1988 | Ouhayoun | 372/32 |
| 4,881,791 | 11/1989 | Mallinson et al. | 385/37 |
| 4,923,271 | 5/1990 | Henry et al. | 385/37 |
| 5,048,909 | 9/1991 | Henry et al. | 385/27 |
| 5,058,977 | 10/1991 | Sorin | 385/37 |
| 5,134,620 | 7/1992 | Huber | 372/6 |

FOREIGN PATENT DOCUMENTS

| 1262793 | 2/1972 | United Kingdom . |
| 1322415 | 7/1973 | United Kingdom . |
| 1447117 | 8/1976 | United Kingdom . |
| 1474277 | 5/1977 | United Kingdom . |
| 1551359 | 8/1979 | United Kingdom . |

*Primary Examiner*—Leon Scott, Jr.
*Attorney, Agent, or Firm*—Jacobson, Price, Holman & Stern

[57] ABSTRACT

An amplifier/filter combination including a fibre amplifier (4) and a fibre reflection/transmission filter (5) coupled to said amplifer. The fibre amplifier amplifies an input signal (1) in response to pump light (2) received from a laser. Preferably the fibre filter (5) is a chirped Bragg fibre filter which is arranged to filter out the unabsorbed portion of the pump light from the output amplified signal and which reflects the unabsorbed portion (7) of the pump light back to the amplifier (4) for re-absorption therein. The amplified signal (6) is transmitted by the filter (5) to a receiver.

7 Claims, 3 Drawing Sheets

AMPLIFIER/FILTER COMBINATION

BACKGROUND OF THE INVENTION

This invention relates to an fibre optical device including a fibre amplifier and a reflection/transmission fibre filter coupled to said amplifier.

Erbium doped fibre amplifiers, which are seen as vital components for future optical communication systems require efficient pumping with semiconductor lasers of high optical power. However not all the pump power is absorbed in the amplifier. The remainder is usually transmitted along with the signal to the receiver. The unabsorbed pump power can be rejected by an absorbing filter or coupled out by a dichroic filter, but in either of these cases it is wasted. A further problem occurs when the amplifier is used as a pre-amplifer and the residual pump power will be of the order of 10 mW while the signal will be typically less than 1 W. Rejection of the pump to less than 50 dB of its residual power requires a very high performance filter. An additional requirement of such a filter is that it operates over a wavelength range of 20 nm so as to cover wavelength fluctuations of the pump source. Further the unabsorbed pump power will produce an excess noise in any receiver which will follow the amplifier.

SUMMARY OF THE INVENTION

According to this invention there is provided an amplifier/filter combination including a fibre amplifier for amplifying an input signal in response to pump light received from a source thereof and a fibre reflection/transmission filter coupled to said amplifier for filtering out the unabsorbed portion of the pump light from the output amplified signal from said amplifier, and for reflecting the unabsorbed portion of the pump light back to the amplifier for re-absorption therein, the amplified signal being transmitted by said filter.

Preferably the fibre amplifier is an erbium doped fibre amplifier having a high transmission at the signal wavelength and the filter is a chirped Bragg fibre filter having a reflection bandwidth equal to or greater than the width of the pump bandwidth. Preferably the chirped Bragg fibre filter is formed by providing a chirped Bragg grating in an optical fibre. The Bragg grating may be formed by etching a grating into the fibre.

The amplifier/filter combination may include a fibre wavelength multiplexer having a first input to receive a signal to be amplified and a second input to receive pump input and having an output coupled to the filter. The pump light may be produced by a laser.

The amplifier is significantly improved by inclusion of a filter at the amplifiers output. In some amplifiers in which the pump power propagates in an opposite direction to the signal a filter should also be attached to the amplifiers input. The purpose of the filter is to reflect the unabsorbed pump power back into the doped fibre amplifier where it will be absorbed leading to an increase in the signal gain and signal output power. The filter also serves to block the unabsorbed pump power from the signal output channel. This feature is particularly important for preamplifiers in which the amplifier is immediately followed by an optical receiver. The design of the filter at the amplifier output is very critical if the pump wavelength is close to the signal wavelength as in the case of a 1.48 m pump laser. A preferred form of filter for use in the present invention is a filter formed by a chirped Bragg grating in the fibre. The filter has reflection and transmission characteristics such that it reflects all emission over the possible pump band and then has a sharp transition to transmit all emission over the signal band.

The primary absorption bands of Erbium doped optical fibre which may be pumped by semiconductor lasers are at wavelengths of 670 nm, 807 nm, 980 nm and 1490 nm. The preferable pump bands are 980 nm and 1490 nm due to their absence of excited state absorption and large absorption cross sections. Both of these bands have significant pump absorption over linewidths of 20 nm. The performance of the filter is particularly critical when the amplifier is pumped at the 1480 nm band because this is very close to the signal band and the absorption cross section is similar to the emission cross section so that a high proportion of the pump is not absorbed. The ideal small signal amplifier is pumped so that the end of the amplifier away from the pump is 50% inverted and just transparent. The pump power, at the end of the fibre, to achieve this is the power unabsorbed by the fibre. By reflecting all this power back into the amplifier then the power at the end is doubled so that the total pump power can be reduced to obtain the same again or the fibre length can be increased and the pump power maintained to achieve more gain.

DETAILED DESCRIPTION OF THE DRAWINGS

Figure 1:
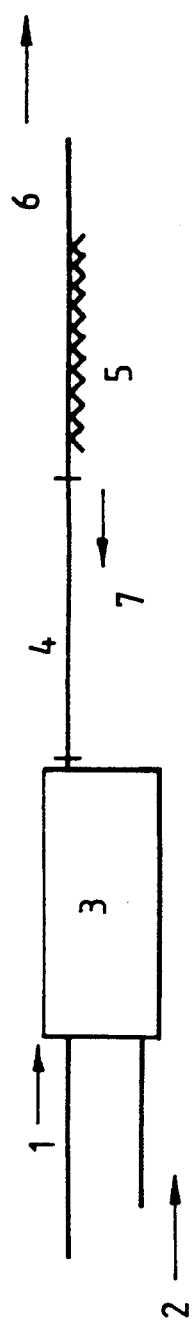
FIG. 1 illustrates an amplifier/filter combination embodying the present invention.

FIG. 1 shows the basic improved fibre amplifier 4 in combination with a reflection filter. An input signal 1 and a pump light 2 are input to the erbium doped fibre amplifier 4 via a fibre wavelength multiplexer 3. The pump light 2 may be produced by a semiconductor laser. Some of the pump light is absorbed in the doped fibre amplifier 4 and this produces amplification of the signal. Amplification in erbium is via a three level system so that the pump light is not totally absorbed after passing through the doped fibre amplifier 4. A fibre filter 5 is attached to the end of doped fibre amplifier 4 so as to pass the amplified signal 6 to the output and reflect the unabsorbed pump light 7 back into the doped fibre amplifier 4.

Figure 2:
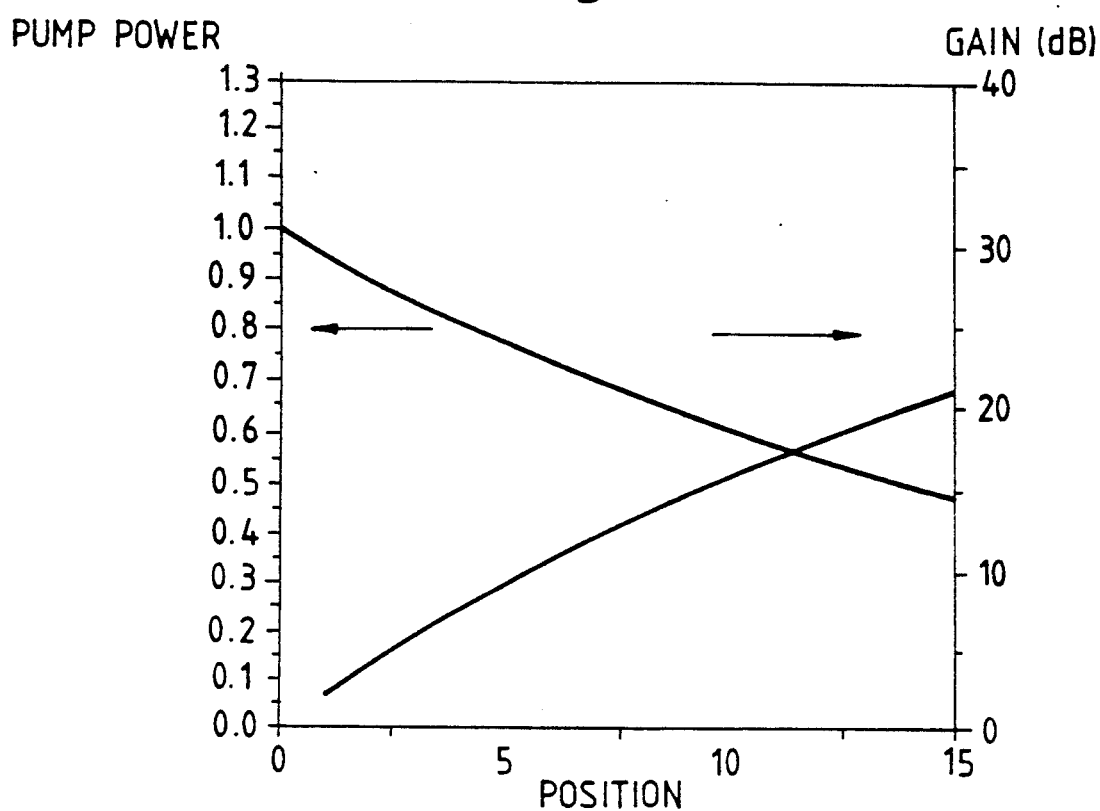
FIG. 2 is a graph showing the performance of the amplifier when pump power is not reflected back to the fibre amplifier.
Figure 3:
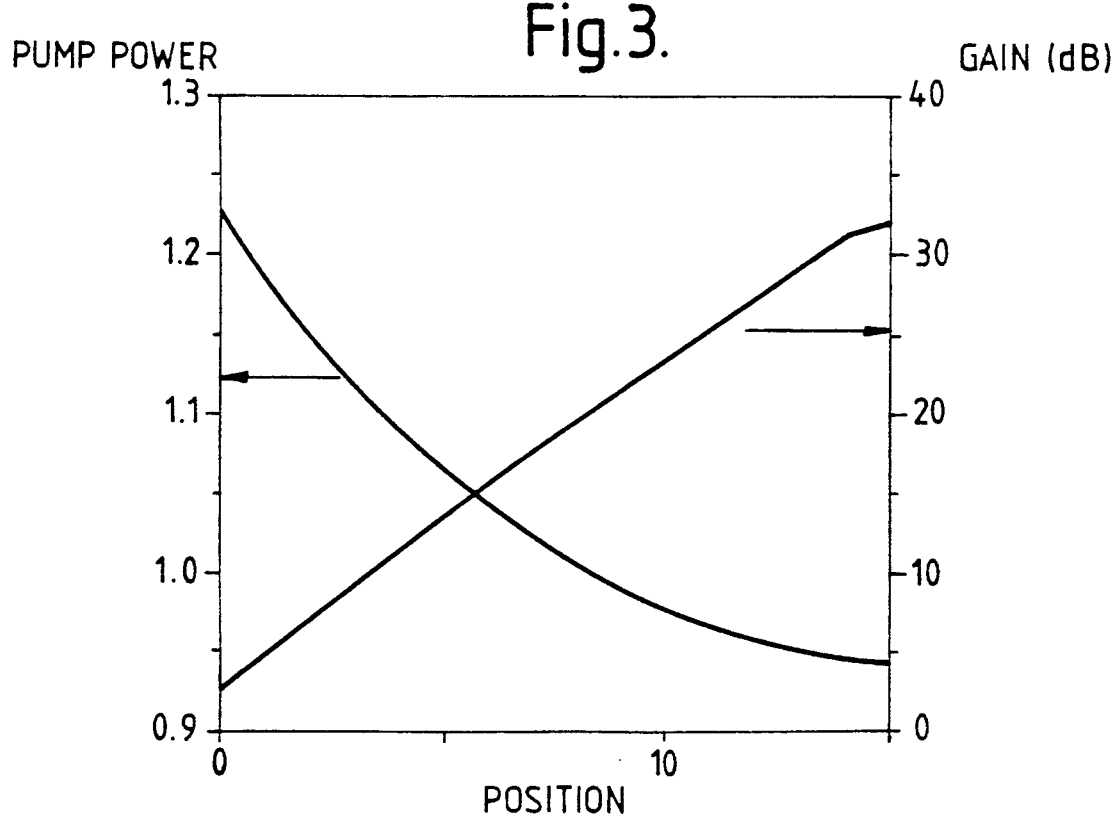
FIG. 3 is a graph showing the performance enhancement of the amplifier when the unabsorbed portion of the pump light is reflected back to the amplifier.

The peformance enhancement of an amplifier with such a filter is illustrated in FIGS. 2 and 3. The graph shown in FIG. 2 shows the attenuation of 1 unit of pump power as it is absorbed along 15 length units of fibre. The accumulated signal gain reaches to a total of 22 dB after the amplifier. At the amplifier output there is still 45% of the pump power unabsorbed. The FIG. 3 graph shows the performance enhancement achieved by reflecting this pump power back into the doped fibre amplifier. The total level of pump power at any position in the fibre is increased. Even the pump power at the input is increased due to 22% of the pump power remaining after propagating through the amplifier in both directions. The amplifier signal gain has been increased from 22 dB to 35 dB leading to a significant improvement in the amplifier performance over that of an amplifier without a filter.

The performance of the filter is important if an improvement in the amplifier performance is to be obtained. The filter must have a very low loss (1 dB) at the signal wavelength, a high reflection (90%) at the pump wavelength and reflection bandwidth which covers all of the pump wavelength but none of the signal band.

Figure 4:
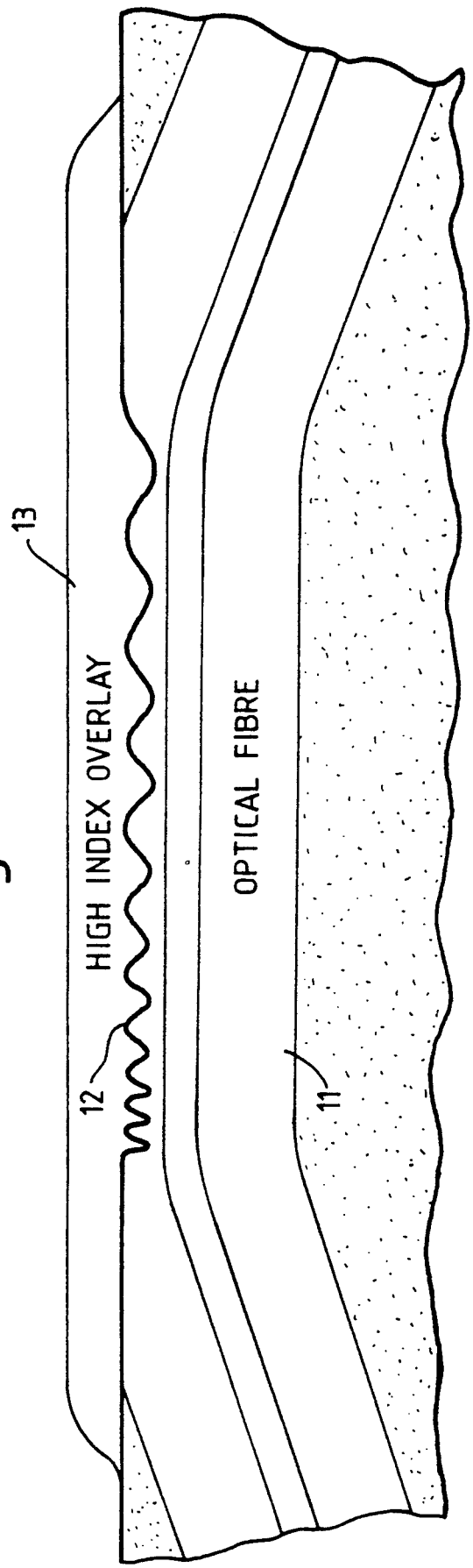
FIG. 4 illustrates a chirped Bragg fibre filter which is used as a reflection/transmission filter in combination with a fibre amplifier in accordance with the present invention.

A preferred form of filter used in the amplifier/filter combination embodying this invention is a filter formed by providing a chirped Bragg grating in the fibre. The fibre filter shown in FIG. 4 is formed by polishing a section of the fibre 11 close to the core to form a half coupler. Photo-resist is then applied to the fibre block and an interference pattern is formed by two beam intereference as described in [I. Bennion et al "High-Reflectivity Monomode-Fibre Grating Filters", Electron. Lett 22, p341, 1986]. Filters with uniform grating periods over interaction lengths of 5 nm typically have reflection bandwidths of 3 nm. However the pump band of erbium amplifier spreads over 20 nm. The grating period for this Brag filter was chirped over an interaction length of 10 mm so that the reflection bandwith was increased to 19 nm. The grating 12 is then etched into the fibre by ion beam milling and then the filter is covered with high index layers 13 of alumina and siclica. The fibre filter can be also manufactured by placing a reflective grating on to a polished half coupler or by direct writing into the fibre. The advantages of using a fibre based filter are its compact size, its high efficiency (99%) and its lack of surfaces exposed to the air.

Figure 5:
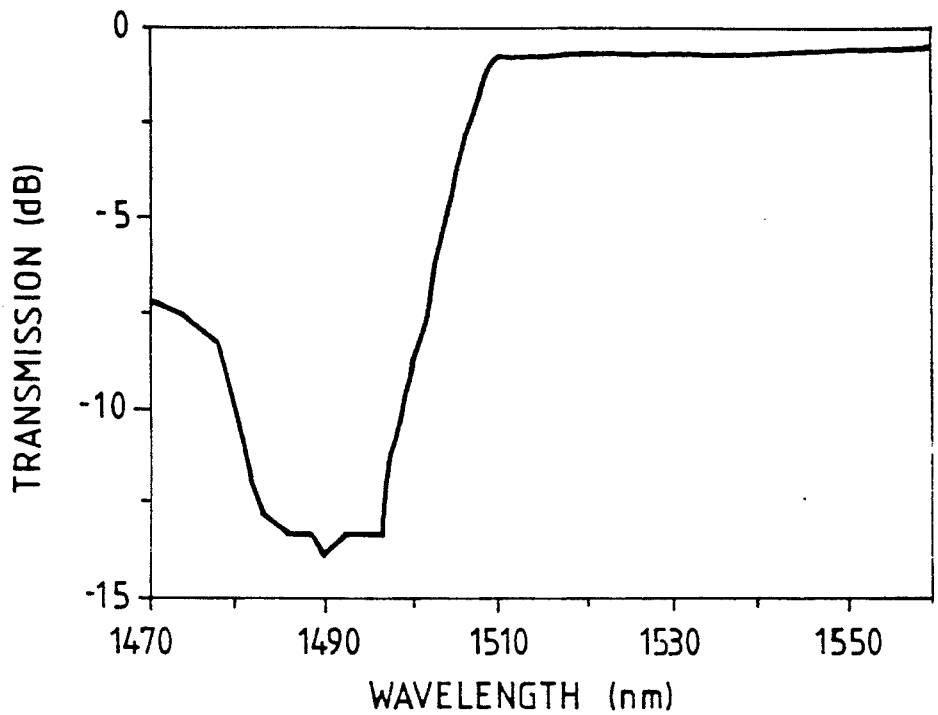
FIG. 5 is a graph showing transmission performance of a chirped Bragg reflection/transmission fibre filter.
Figure 6:
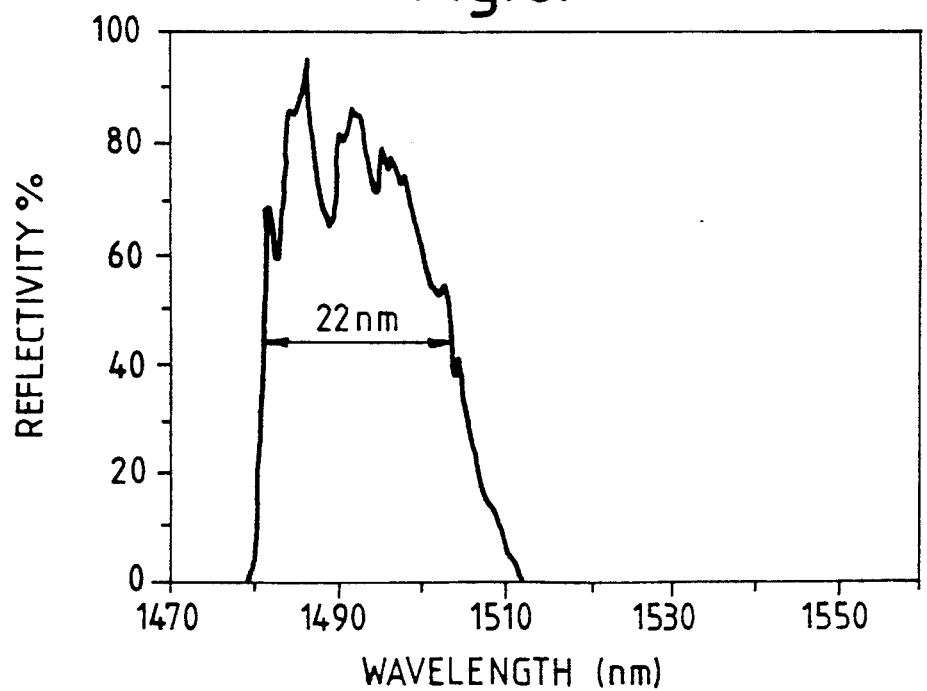
FIG. 6 is a graph showing reflection performance of the chirped Bragg reflection/transmission fibre filter.

The performance of this fibre grating in both reflection and transmission is shown in FIGS. 5 and 6. The filter has a peak reflectivity of 95% back into the input fibre. There is a ripple on the reflection spectrum but the reflectivity is greater than 60% over a bandwidth of 18 nm. These filters are particularly advantageous due to their broad bandwidth of 22 nm and their steep edge. This filter has a low loss of only 0.5 dB at a wavelength only 5 nm away from the 40% reflection point. These filters may also be used for fire tuneable fibre lasers.

We claim:

1. A fiber optic device comprising:
   a fiber amplifier having a broad absorption bandwidth with at least one absorption frequency receiving an optical input signal having an input signal frequency bandwidth, and an input pump light signal from a pump light source at frequencies within the broad absorption bandwidth of the fiber amplifier, said fiber amplifier absorbing a portion of the input pump light at said at least one absorption frequency and thereby amplifying the optical input signal and producing an output amplified signal, said fiber amplifier passing an unabsorbed portion of the input pump light at frequencies adjacent to said at least one absorption frequency with the output amplified signal; and
   a fiber filter coupled to said fiber amplifier having a reflection and transmission characteristic for filtering out the unabsorbed portion of the input pump light and reflecting the unabsorbed portion back to the amplifier for absorption therein, and for transmitting the output amplified signal.

2. A fibre optic device as claimed in claim 1, wherein the amplifier is an erbium doped amplifier.

3. A fibre optic device as claimed in claim 1, wherein the filter is a chirped Bragg fibre filter having a reflection bandwidth greater than a bandwidth of the input pump light.

4. A fibre optic device as claimed in claim 3, wherein the chirped Bragg filter is formed by providing a chirped optical fibre Bragg grating in an optical fibre.

5. A fibre optic device as claimed in claim 4, wherein the Bragg grating is formed by etching a grating into the fibre.

6. A fibre optic device as claimed in claim 1, wherein the source of the input pump light is a laser.

7. A fibre optic device as claimed in claim 1, and further including a fibre wavelength multiplexer having a first input a receive the optical input signal to be amplified and a second input to receive the input pump light signal and having an output coupled to an input of said fibre amplifier.

* * * * *